J. S. SHEAFE.
COUPLING HEAD.
APPLICATION FILED SEPT. 16, 1908.

922,347.

Patented May 18, 1909.

WITNESSES:
George J Graham
Frederick W Bason

INVENTOR
James S. Sheafe

UNITED STATES PATENT OFFICE.

JAMES S. SHEAFE, OF CHICAGO, ILLINOIS.

COUPLING-HEAD.

No. 922,347.          Specification of Letters Patent.          Patented May 18, 1909.

Application filed September 16, 1908. Serial No. 453,346.

*To all whom it may concern:*

Be it known that I, JAMES S. SHEAFE, a citizen of the United States, and a resident of Chicago, in the county of Cook and State of Illinois, have invented certain new and useful Improvements in Coupling - Heads Such as are Used with Air-Brake Hose at This Time; and the following is a clear, full, and exact description of the same, reference being had to the accompanying drawing, which forms a part of these specifications, in which—

Figure 1:
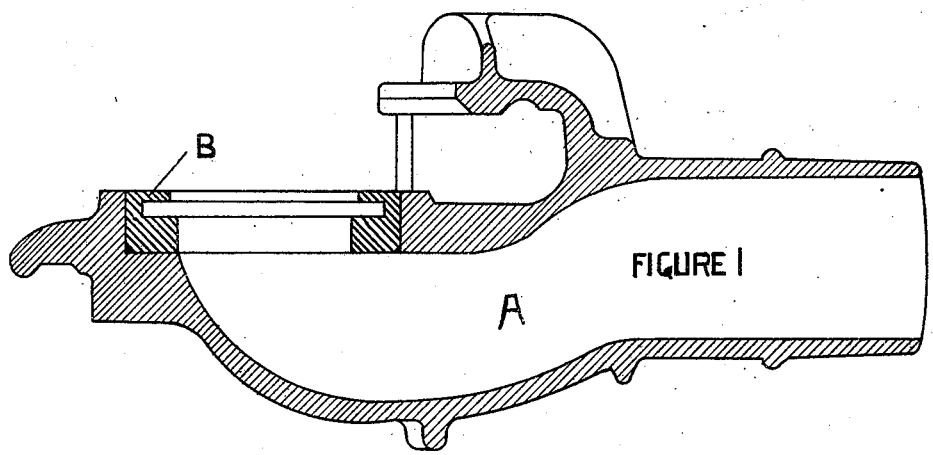
Figure 2:
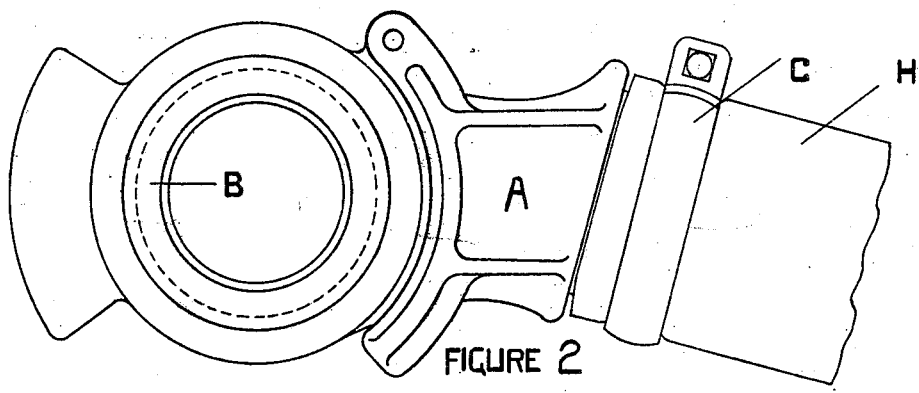
Figure 3:
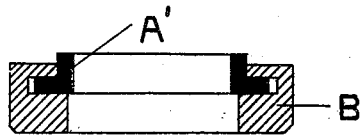

Figure 1, is a longitudinal sectional view of my device; Fig. 2 is a top, or plan, view of the same, and Fig. 3 is a sectional view of the detached gasket seat with the gasket located therein.

Similar letters refer to similar parts in the drawing.

The objects of my invention are; first, to provide a separately made non-corrodible gasket seat having a tight and perfect fitting connection with the surrounding body of the air hose, or train pipe, coupling, hereinafter referred to in the specification and claims as a train pipe coupling; secondly, to provide a means of rejuvenating old and rusted train pipe couplings, thereby lengthening their total time of service; thirdly, to provide a means of preventing waste caused by scrapping all couplings which develop sand or blow holes in machining; and fourthly, to enable the train line of railway equipment to be made, and to remain, as perfectly air tight as possible.

With these and other objects in view, the invention consists of the combination and arrangement of parts as will be hereinafter and more in detail described and specifically claimed.

Referring to the drawing, by letter;—A designates a train pipe coupling of the type or construction ordinarily manufactured by the Westinghouse Air Brake Company, and is that coupling which is the standard article at this time among the railroads of the United States, for coupling together the air hose, between cars and locomotives, and which forms no part of my invention, and a further description of the same is not deemed necessary.

A′ designates a compressible gasket, similar to the gasket now used wholly as a standard in the above mentioned coupling.

B, designates a gasket seat located in the recess, or opening, formed in the face of the train pipe coupling and by means of frictional contact therewith, the gasket seat's resiliency forms, by such resiliency, a tightly fitting and perfect joint with the body of the coupling, thus preventing any leakage of air, and dispensing with the screw threads generally used in such construction.

Train pipe couplings are made wholly of malleable iron, and thus it is impossible to machine an absolutely smooth surface, either on the face of the coupling or within the annular recess which carries the rubber gasket. It is also essential, for an air tight contact, between the gasket and its seat, that the surface of the latter be as smooth as possible. A gasket seat which is made of non-corrodible, or non-rusting material, or metal, enables such a surface to be obtained, and also, to be maintained.

A train pipe coupling made of the above mentioned material (malleable iron) becomes rusted and pitted within a short time after the coupling has been put into service, and hence exposed to the weather, and results in a leakage of air between the gasket and gasket seat, causing delays to trains, while new gaskets are put in, and causing the air pump to work much harder, than would otherwise be required, to supply such leaks. A non-corrodible gasket seat, as shown and described, in addition to providing a perfect seat for the gasket, will always continue so to do as there is no deterioration.

A train pipe coupling, which is made wholly of malleable iron, becomes wasted away to such an extent, in the upper and thinner portion or gasket seat, as to render it within a short time useless in service and it must be scrapped, although in other particulars it would be in serviceable condition. This condition causes an immense loss to railroad companies using a large number of the couplings. Such a scrap coupling can, by the addition of my non-corrodible seat, be put into splendid shape for service, and it will even then outlive a new coupling if made wholly of malleable iron. Sand and blow holes often develop in these couplings while they are being machined, rendering them unfit for use and they are scrapped. These holes are effectually stopped, or blocked, when the bushing is located in position, as the leak is entirely shut off and rendered harmless.

The cutting of the slot, or recess which holds the gasket, in a coupling, is a separate operation, which requires separate chucking of the coupling, and, being an operation in iron, is necessarily slow. The non-corrodible gasket seat can be made by the thousands and with absolute precision on a machine for this class of work.

The opening in the coupling to receive the bushing, or gasket seat, is reamed true to size and is a matter of three one-thousandths of an inch smaller than the latter. The bushing can be pressed into place by an arbor press, or other means desired and suitable.

Brass allows of a more perfect piece being turned out, and can be manufactured in large numbers.

I am aware of many patents which cover train pipe couplers but have illustrated the one most commonly in use at this time.

The non-corrodible bushing is adapted to any hose coupling used for the passage of air pressure.

What I claim and desire to secure by Letters Patent is;

1. An air brake train pipe coupling having a separate gasket seat of non-corrodible metal secured thereto by a pressed joint.

2. A coupling head for train air brake pipes having a gasket seat of non-corrodible metal formed separately from the coupling head and being non-leakably located therein.

3. A coupling head for train air brake pipes having a gasket seat of non-corrodible metal formed separately from the coupling head and non-leakably inset into the coupling face thereof.

4. A coupling head for train air brake pipes having a gasket seat of non-corrodible metal formed separately therefrom and non-leakably inset into the coupling face thereof by a pressed joint.

5. The combination with the coupling head of a train air brake pipe of a non-corrodible gasket seat rigidly attached thereto and a compressible gasket carried in said seat.

6. The combination with the coupling head of a train air brake pipe of a non-corrodible gasket seat rigidly inset into the face thereof and a compressible gasket carried in said seat.

7. A train air brake coupling head of the Westinghouse type in combination with a separately formed gasket seat of non-corrodible metal seated therein.

8. A train air brake pipe coupling head of the Westinghouse type in combination with a separately formed gasket seat of non-corrodible metal inset into the coupling face thereof.

9. A train air brake pipe coupling head of the Westinghouse type in combination with a separately formed gasket seat inset into the coupling face thereof and held in place by a pressed joint.

10. A train air brake pipe coupling head of the Westinghouse type in combination with a separately formed gasket seat of non-corrodible metal inset into the coupling face thereof and held in place by a pressed joint.

11. The combination with a train air pipe coupling of the Westinghouse type of a separately formed gasket seat of non-corrodible metal and a compressible gasket located in said seat.

12. The combination with a train air pipe coupling of the Westinghouse type of a separately formed gasket seat of non-corrodible metal inset in the coupling face thereof and a compressible gasket located in said seat.

13. As an article of manufacture, a non-corrodible gasket seat adapted to be applied to worn out coupler heads.

14. As an article of manufacture a non-corrodible gasket seat for train air pipe coupler heads made separately therefrom and adapted to be applied thereto as a remedy for leakage caused by corrosion or faulty casting.

15. As an article of manufacture a gasket seat for train air pipe coupler heads made separately therefrom and adapted to be applied thereto by a pressed joint.

16. As an article of manufacture a gasket seat of non-corrodible metal for train air pipe coupler heads made separately therefrom and adapted to be applied thereto.

17. The combination with a train pipe coupling of the Westinghouse type of a separately formed gasket seat of non-corrodible material and a compressible gasket located in said seat.

JAMES S. SHEAFE.

Witnesses:
GEORGE J. GRAHAM,
F. W. BASON.